United States Patent Office 2,757,278
Patented July 31, 1956

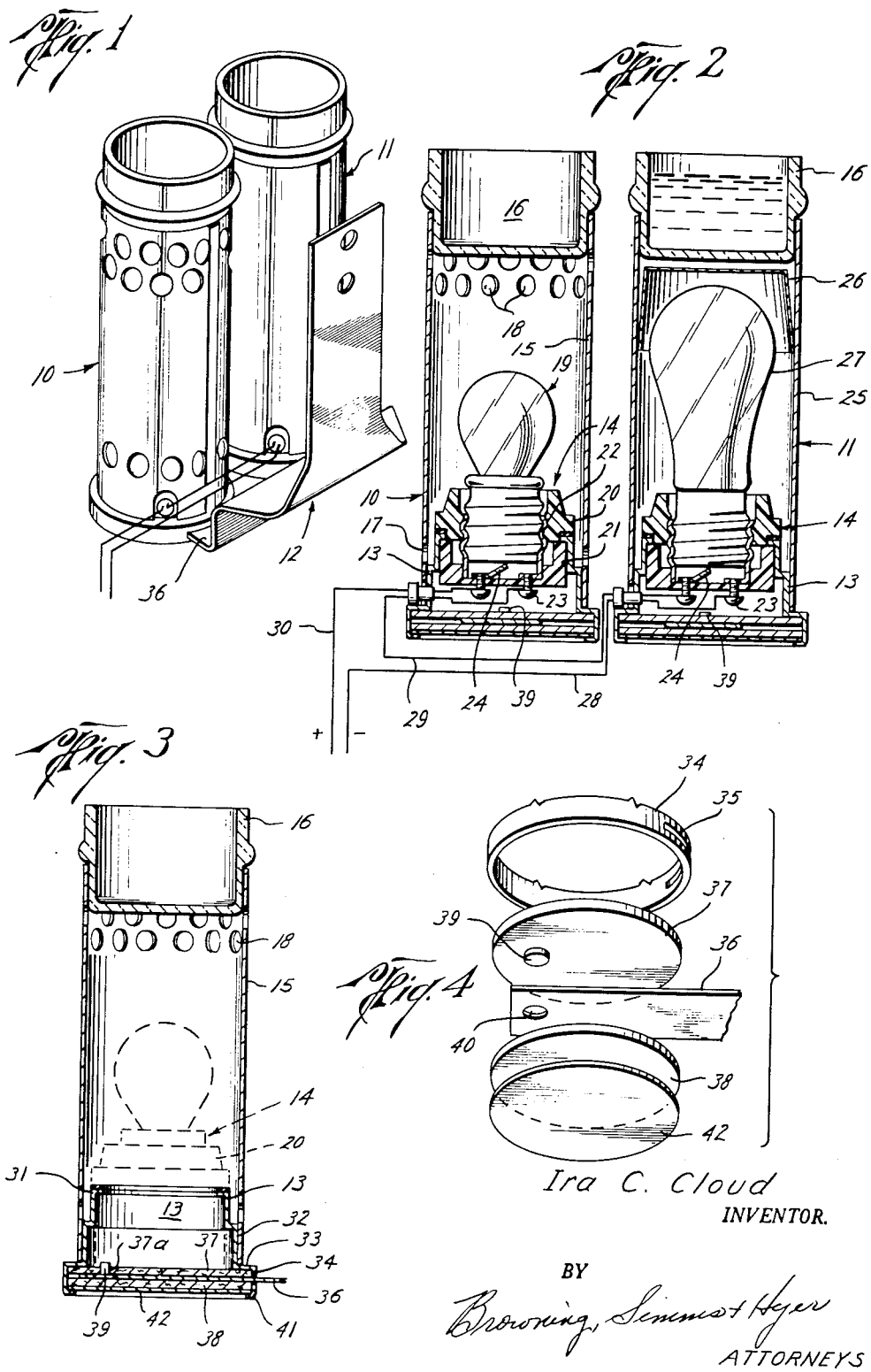

2,757,278

PIN-UP LAMP DEVICE

Ira C. Cloud, Pasadena, Tex.

Application May 31, 1955, Serial No. 512,152

3 Claims. (Cl. 240—73)

This invention relates to a sanitary device. In one aspect it relates to a combination ozone lamp and vaporizer. In another aspect it relates to a novel means of securing a lamp base or housing to a wall bracket.

Ozone generated by an ozone lamp will combine chemically with substances to change their character. This characteristic of ozone is very valuable in the control of odors by oxidation and ozone lamps have been used to effectively reduce odors from cooking, tobacco, smoke, etc. Ozone is also germicidal in its effect and has the advantage over germicidal lamps that the ozone follows air circulation and reaches behind obstacles which are not reached direct radiation of germicidal lamps.

However, ozone lamps presently available operate at much lower voltage than available from commercial power lines and a ballast must be provided to reduce the line voltage to the designed voltage of the ozone lamp and to limit current flow through the lamp. Such a ballast may be provided by a resistance such as an incandescent lamp but the power consumed in the lamp is usually wasted.

Odors, bacteria, and bugs are also controlled by vaporizing certain chemicals such as triethylene glyco for the control of odors, germs and bacteria and the vaporization of certain chemicals such as hexachloride for the control of bugs such as roaches, ants, mosquitoes, etc. Vaporizers for this service are frequently operated by a resistance heater such as an incandescent lamp.

A combination of ozone lamp and vaporizer provides an ideal sanitation control for use in the home, office, commercial rest rooms and the like, and it is an object of this invention to combine a vaporizer and ozone lamp in such a manner that the power consumed in the ozone lamp ballast is not wasted, but is utilized by the vaporizer.

Another object is to provide a combined ozone lamp and vaporizer in which the heating element for the vaporizer provides a ballast for the ozone lamp.

Another object is to provide a combined ozone lamp and vaporizer in which an incandescent lamp provides heat for the vaporizer and ballasts the ozone lamp.

Preferably, sanitary devices of the nature described above are pinned to a wall of a room and, therefore, the lamp housing and a wall bracket for hanging the sanitary unit on a wall desirably should be provided as an integral unit instead of by a clamp arrangement in which the lamp base is clamped, screwed or bolted to the bracket as is conventional. It is an object of this invention to provide a lamp housing in which the wall bracket for pinning the lamp to a wall is assembled with the housing as an integral part of the housing.

An object is to provide a simple, inexpensive means of securing a bracket and lamp housing together.

Another object is to provide a lamp housing and bracket in which the housing and bracket are permanently secured together upon assembly of the housing.

Another object is to provide a simple, inexpensive means of securing a bracket and lamp housing together using a minimum number of parts and a minimum amount of labor.

Another object is to provide a lamp housing and bracket support therefor in which the lamp housing cannot be removed from the bracket without partially disassembling the lamp housing.

Other features, objects, and advantages of the invention will be apparent to one skilled in the art from a consideration of the drawings, specification and appended claims.

In the drawings wherein there is shown by way of illustration one embodiment of this invention, and wherein like numerals indicate like parts:

Fig. 1 is an isometric view of a sanitary device constructed in accordance with this invention;

Fig. 2 is a view in vertical cross section taken through the device of Fig. 1;

Fig. 3 is a view in vertical cross section through the ozone lamp housing taken 90° away from the Fig. 2 section; and Fig. 4 is an exploded view on an enlarged scale of a portion of the base of the ozone lamp housing of Fig. 3 illustrating the details of the parts utilized in securing the bracket and housing together upon assembling the lamp housing.

Referring now to the drawings, the sanitary device selected for illustration in this application will be seen to comprise an ozone lamp indicated generally at 10 and a vaporizer indicated generally at 11, both carried by a wall pin-up bracket indicated generally at 12.

The ozone lamp housing is provided by a lower housing 13 which carries the lamp socket indicated generally at 14 and which is secured to bracket 12 as will more fully appear hereinafter. The remainder of the ozone lamp housing is provided by a barrel housing 15 having one end in frictional engagement with the lower housing 13 and the other end closed by a heat resistant glass cup 16. Barrel 15 and cup 16 should both be constructed of a material impervious to short-wave radiation as some of the rays emitted by an ozone lamp are harmful to the eyes. Preferably, the housing sections 13 and 14 are fabricated from aluminum and the top closure is made of glass. The top closure 16 might take any form but the glass cup is preferred as it is interchangeable with the cup of the vaporizer and will simplify inventory and construction of the unit. It also provides a spare cup for the vaporizer in the event the vaporizer cup is broken.

Ozone lamp 10 causes the formation of ozone in the air and hence circulation of air through the ozone lamp is necessary. For this reason, lower circulating ports 17 are provided in barrel 15 at a point adjacent socket 14 and circulating ports 18 are provided in barrel housing 15 at its upper end. The lamp is used with barrel 15 in an upright position and convection circulaiton of air into the barrel through ports 17 and out of the barrel through ports 18 is relied upon to carry ozone formed within the ozone lamp out into the room.

A conventional ozone lamp indicated generally at 19 is made up in socket 14 and when supplied with a proper current will cause ozone to be produced within barrel 15.

Referring now to socket 14, it will be seen to be of conventional form. The socket 14 includes insulating parts 20 and 21 with a cylindrical metallic bulb receiver 22 secured to the lower insulating piece 21 by a plurality of screws, one of which is shown at 23. The cylindrical bulb receiver 22 is threaded to receive internally the threaded end of ozone bulb 19 and to threadedly receive externally piece 20 of the bulb socket. The lower half 21 of the socket is provided with the conventional leaf spring contact 24 for engaging the lower end of the bulb 19 when it is made up in the socket.

The vaporizer 11 also has a two-piece housing. The lower portion of the housing is identical with housing 13 of the ozone lamp. The upper portion of the housing is provided by a barrel 25 which is identical with barrel 15 except that there are no ventilating ports in the housing. The housing is closed by a heat resistant glass cup 16 in which chemicals are received for vaporization. If the cup 16 is transparent and it is desired that the vaporizer be light-tight, an opaque cover 26 such as a piece of tin foil may be placed within barrel 25 immediately below cup 16 to prevent the emission of light out the top of the vaporizer.

The lamp socket for the vaporizer is identical with socket 14 of the ozone lamp. In fact, the base and socket of the ozone lamp and vaporizer are identical and interchangeable.

Ozone lamps are designed to operate at a much lesser voltage than the line voltage currently available from commercial lines and they must be provided with a ballast to reduce the voltage across the lamp and to limit the current flowing through the lamp. For instance, there is presently available an ozone lamp manufactured by General Electric Company of Cleveland, Ohio, which is designed to operate on 10½ volts with a current of 350 milliamperes. Thus, if the sanitary unit of this invention is employed in a building having available standard 115–125 volt 60 cycle A. C. service, a ballast must be provided which will reduce this voltage to approximately 10½ volts and the current through the lamp to approximately 350 milliamperes. A larger current tends to reduce life of the lamp while a lesser current reduces efficiency of the lamp. It requires a resistance of approximately 300 ohms to reduce such a line voltage to approximately 10½ volts and to limit the current to 350 milliamperes. A small vaporizer such as shown in the drawing utilizing triethylene glyco as a means for providing vapors requires a 40 watt incandescent lamp for generating heat which has a resistance of approximately 300 ohms. Thus, by wiring the ozone lamp and the vaporizer in series with each other, the incandescent bulb 27 of the vaporizer acts as a ballast for ozone lamp 19 and the ozone lamp is ballasted in a simple, economical manner without loss of power. Referring to Fig. 2, it will be seen that current entering the sanitary unit through line 28 is fed into bulb 27 through screw 23 and leaves the vaporizer by leaf spring 24 and line 29. Line 29 extends into the ozone lamp and connects to screw 23 to conduct current to the ozone lamp. Current leaves the ozone lamp through leaf spring 24 and returns to source through line 30. Thus, the incandescent lamp 27 is wired in series with ozone lamp 19 and will provide a ballast therefor while at the same time generating heat to vaporize the chemical within receptacle 16.

To simplify assembly and construction, to reduce the cost of the sanitary unit, and to prevent unintentional disengagement of the vaporizer or ozone lamp from its bracket, it is preferred that both the lamp and vaporizer be permanently secured to a bracket during assembly of the sanitary unit. As the units will be used when in an upright position, as viewed in the drawings, it is preferred that the bracket be secured to the lower portion of the housing of both the vaporizer and ozone lamp so that the barrel portions of the housings will be gravity biased toward engagement with the other portion of each housing.

The lower housing 13 must be closed on its nether side to enclose the wiring and this is usually accomplished by a flat plate secured within the bottom of the housing 13. In order to secure the base to the bracket, a second plate is provided and the bracket sandwiched between these two plates. A locking mechanism is also provided for locking the bracket between the plates.

Referring particularly to Fig. 3, it will be noted that lower housing 13 has at one end an inturned annular flange 31 which is received between the two parts 20 and 21 of the socket to secure the lower housing and socket together. Housing 13 also has an enlarged cylindrical portion 32 which frictionally receives the end of barrel housing 15. The enlarged cylindrical portion 32 terminates in an outturned flange portion 33 which provides a shoulder or stop. A still further enlarged cylindrical portion 34 extends endwise from shoulder 33. A slot 35 is provided in cylindrical portion 34 through which a finger 36 carried by bracket 12 extends. Finger 36 preferably extends substantially across the lower housing 13. A rigid plate 37 is positioned between finger 36 and shoulder 33 with one face of the plate resting against shoulder 33 and the other face in contact with the adjacent face of finger 36. A closure plate 38 is positioned on the other side of finger 36 from plate 37 and has a face abutting finger 36 so that the finger will be frictionally held between the two plates 37 and 38.

To prevent relative movement between the base and finger 36, there is provided a locking arrangement between finger 36 and one of plates 37 and 38. This may be provided by a pin 39 carried by plate 37 and having a portion protruding from plate 37 and extending into a hole 40 in finger 36. The amount of protrusion of pin 39 should be no more than the depth of finger 36 so that plate 38 will not be spaced from finger 36 by pin 39.

Simple, inexpensive plates 37 and 38 may be fabricated from pressed wood and a hole 37a punched into plate 37. A conventional rivet may then provide the pin 39 with the head of the rivet projecting into hole 40 in finger 36.

Means are provided for holding the finger 36 tightly sandwiched between the two plates 37 and 38 to prevent relative movement between finger 36 and base 13. This means is preferably provided by turning the end of cylindrical portion 34 of base 13 inwardly as at 41 and crimping the two plates and finger between the inturned portion 41 of the base and shoulder 33. If desired, a thin sheet of aluminum 42 may be interposed between plate 38 and the crimped portion 41 of the body to enhance the appearance of the sanitary unit.

In assembling the sanitary unit, the two sockets 14 are made up about the two bases 13 and the two sockets series wired together with wires 28, 29 and 30. The two bases may then be secured to bracket 12 one at a time if desired. The rivet 39 is first inserted in plate 37 or 38 whichever is selected to carry the locking rivet. Plate 37 is preferred as it permits the rivet to extend into the space between the plate 37 and the socket 21. Plate 37 is seated against shoulder 33. The finger 36 of bracket 12 is then inserted through slot 35 in the base and pin 39 introduced into hole 40. The lower plate 38 and cover 42 are then inserted and the bottom of base 13 bent inwardly to crimp the plates and bracket finger in position in housing 13. By providing a strong, tight crimp, it will be impossible to remove the bracket finger 36 without disassembling the housing 13. Due to the frictional contact between the shoulder 33, the plate 37, the finger 36, the plate 38, the inturned crimp portion 41 of the base 13, and the lock provided by the pin 39, it will be difficult if not impossible to move the finger 36 relative to body 13 without disassembling the base. It is preferred that the two plates 37 and 38 have an outer diameter which is substantially the same as the inner diameter of cylindrical portion 34 of base 13 as illustrated to assist in preventing relative movement between finger 36 and body 13.

The ozone bulb 19 and incandescent bulb 27 are then screwed into the sockets 14 and the respective housings 15 and 25 inserted over the bulbs and into engagement with lower housing 13. If desired, an opaque light shield 26 may be inserted over the incandescent bulb. The two top closures 16 are then inserted in the top of the barrel housings 15 and 25 and a suitable chemical placed within the receptacle 16 of the vaporizer.

It will be understood that a number of ozone lamps might be connected as explained hereinabove in series with a vaporizer by selecting the resistance heating element of the vaporizer to have an ohm rating which will provide the desired voltage and current across the ozone lamps.

It will also be appreciated that if it is desired to use the vaporizer alone a bridge such as fuse plug might be substituted for the ozone lamp. If it is desired to vaporize a chemical which requires a greater or lesser amount of heat than provided by a 40 watt bulb, the ozone lamp socket might be bridged by a fuse plug or the like and the appropriate size incandescent bulb placed in the vaporizer.

From the above it will be appreciated that all of the objects of this invention have been accomplished. There has been provided a sanitary unit having in combination an ozone lamp and a vaporizer in which the heating element for the vaporizer provides the ballast for the ozone lamp as well as providing the heat for the vaporizer. There has also been provided a simple, economical assembly for permanently securing both the vaporizer and ozone lamp to a wall bracket to permit the santiary unit to hang on a wall. While both the vaporizer and ozone lamp are shown carried by one bracket, it will be appreciated that they might be separated if convenient.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pin-up lamp comprising, a wall bracket adapted to be pinned to a wall and having an outturned finger for attachment to a lamp base, a lamp base slotted on one side to receive said finger, an internal shoulder in the base adjacent the slot to provide a stop, a plate seated on said shoulder and having a face engaging the finger, a closure plate in the base and engaging the finger on the side opposite said first-mentioned plate, an interengaging pin and hole, one of said pin and hole carried by the finger and the other carried by one of the plates to prevent relative movement between the finger and the base when the lamp is assembled, and means carried by the base for firmly clamping the two plates and finger between the shoulder and said means to prevent disengagement of the pin and hole and to firmly secure the base to the finger.

2. A pin-up lamp comprising, a wall bracket adapted to be pinned to a wall and having an outturned finger for attachment to a lamp base, a lamp base slotted on one side to receive said finger, an internal shoulder in the base adjacent the slot providing a stop, a plate seated on said shoulder and having a face engaging the finger, said plate having a pin therein protruding beyond the plate on its side opposite the shoulder, said finger having a hole receiving said pin to prevent relative movement between the finger and the base when the lamp is assembled, a closure plate the base and engaging the finger on the side opposite said first-mentioned plate to hold the finger firmly against said first-mentioned plate, and means carried by the base firmly clamping the two plates and finger between the shoulder and said means to prevent disengagement of the finger and pin and to firmly secure the base to the finger.

3. The lamp of claim 2 wherein the clamping means is provided by crimping the base over the closure plate.

References Cited in the file of this patent
UNITED STATES PATENTS

| | | |
|---|---|---|
| 1,548,620 | Lollis | Aug. 4, 1925 |
| 1,726,168 | Townsend | Aug. 27, 1929 |
| 1,737,622 | Thompson | Dec. 3, 1929 |
| 1,818,119 | Doane et al. | Aug. 11, 1931 |
| 2,104,414 | Crockett et al. | Jan. 4, 1938 |
| 2,494,398 | McCann | Jan. 10, 1950 |
| 2,622,287 | Eklund | Dec. 23, 1952 |
| 2,638,644 | Rauhut | May 19, 1953 |
| 2,686,252 | Geraci | Aug. 10, 1954 |